US009643615B2

(12) United States Patent
Kline

(10) Patent No.: US 9,643,615 B2
(45) Date of Patent: May 9, 2017

(54) AUTOMOTIVE DYNAMIC VIRTUAL NETWORK

(71) Applicant: International Business Machines Corporation, Armonk, NY (US)

(72) Inventor: Eric V Kline, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 244 days.

(21) Appl. No.: 14/295,937

(22) Filed: Jun. 4, 2014

(65) Prior Publication Data

US 2015/0353008 A1 Dec. 10, 2015

(51) Int. Cl.
*G08G 1/123* (2006.01)
*B60Q 1/00* (2006.01)
(Continued)

(52) U.S. Cl.
CPC ............ *B60W 40/04* (2013.01); *G08G 1/162* (2013.01); *G08G 1/166* (2013.01); *G08G 1/167* (2013.01); *B60W 30/08* (2013.01)

(58) Field of Classification Search
CPC ............... G08G 1/161; G08G 1/0965; G08G 1/096791; G08G 1/20; G08G 1/22; H04W 84/18; H04W 4/046
See application file for complete search history.

(56) References Cited

U.S. PATENT DOCUMENTS 6,324,467 B1* 11/2001 Machii .................. G01C 21/32
701/420
6,356,820 B1* 3/2002 Hashimoto ............ G08G 1/22
180/167

(Continued)

FOREIGN PATENT DOCUMENTS

EP 1727311 A1 11/2006
EP 1410364 B1 10/2007

(Continued)

OTHER PUBLICATIONS

Wikipedia, Intelligent transportation system, http://en.wikipedia.org/wiki/Intelligent_Transport_Systenns, Last retrieved May 9, 2014.

(Continued)

*Primary Examiner* — Steven Lim
*Assistant Examiner* — Muhammad Adnan
(74) *Attorney, Agent, or Firm* — Kunzler Law Group

(57) ABSTRACT

An apparatus includes a vehicle position module that determines a position of each proximal vehicle with respect to a user's vehicle. Each proximal vehicle is positioned in relation to the user's vehicle without another vehicle between the proximal vehicle and the user's vehicle. A vehicle network module establishes a communication link between the user's vehicle and the proximal vehicles. A message receiver module receives an alert message from a front proximal vehicle in front of the user's vehicle in response to the front proximal vehicle sending the alert message. A message transmitter module transmits an alert message to a rear proximal vehicle traveling behind the user's vehicle. The transmitted alert message includes an alert message received from a front proximal vehicle and/or an alert message generated within the user's vehicle. An alert action module takes an action with respect to the user's vehicle in response to receiving an alert message.

18 Claims, 5 Drawing Sheets

(51) Int. Cl.
  *B60C 23/00*  (2006.01)
  *B60C 23/02*  (2006.01)
  *B60Q 1/50*  (2006.01)
  *B60Q 1/52*  (2006.01)
  *B60W 40/04*  (2006.01)
  *G08G 1/16*  (2006.01)
  *B60W 30/08*  (2012.01)

(56) References Cited

U.S. PATENT DOCUMENTS

| | | | | |
|---|---|---|---|---|
| 6,526,340 | B1* | 2/2003 | Reul | G05B 23/027 340/439 |
| 7,653,473 | B2* | 1/2010 | Yoshida | G08G 1/161 701/96 |
| 7,894,982 | B2* | 2/2011 | Reeser | G01C 21/26 340/995.12 |
| 8,265,987 | B2 | 9/2012 | Goto | |
| 8,289,186 | B2* | 10/2012 | Osafune | G08G 1/20 340/435 |
| 8,311,858 | B2 | 11/2012 | Everett et al. | |
| 8,428,514 | B2 | 4/2013 | Wu et al. | |
| 8,682,004 | B2* | 3/2014 | Grigsby | G08G 1/0962 340/435 |
| 8,855,860 | B2* | 10/2014 | Isaji | B62D 6/00 340/435 |
| 9,076,341 | B2* | 7/2015 | Funabashi | G08G 1/22 |
| 9,384,666 | B1* | 7/2016 | Harvey | G08G 1/22 |
| 9,396,661 | B2* | 7/2016 | Okamoto | G08G 1/22 |
| 2002/0099485 | A1* | 7/2002 | Browne | B60R 21/013 701/45 |
| 2004/0215373 | A1* | 10/2004 | Won | G08G 1/161 701/1 |
| 2004/0246144 | A1* | 12/2004 | Siegel | G08G 1/0965 340/902 |
| 2005/0088318 | A1* | 4/2005 | Liu | G08G 1/161 340/902 |
| 2006/0220826 | A1* | 10/2006 | Rast | G08G 1/162 340/479 |
| 2007/0132608 | A1* | 6/2007 | Votaw | G08G 1/0965 340/903 |
| 2007/0162550 | A1* | 7/2007 | Rosenberg | H04L 12/581 709/206 |
| 2007/0219720 | A1* | 9/2007 | Trepagnier | B60W 30/00 701/300 |
| 2008/0106435 | A1* | 5/2008 | Kirkpatrick | G08G 1/0965 340/902 |
| 2008/0301250 | A1* | 12/2008 | Hardy | G06Q 10/107 709/207 |
| 2009/0231432 | A1* | 9/2009 | Grigsy | G08G 1/161 348/149 |
| 2010/0198513 | A1* | 8/2010 | Zeng | B60W 40/02 701/300 |
| 2011/0080302 | A1* | 4/2011 | Muthaiah | H04L 47/10 340/903 |
| 2012/0106537 | A1* | 5/2012 | Yousefi | H04N 7/183 370/350 |
| 2012/0161951 | A1* | 6/2012 | Ito | B60Q 9/008 340/435 |
| 2012/0281605 | A1* | 11/2012 | Himmelstein | G06Q 10/10 370/310 |
| 2012/0290146 | A1* | 11/2012 | Dedes | G08G 1/163 701/1 |
| 2012/0294238 | A1 | 11/2012 | Uhler | |
| 2013/0191132 | A1* | 7/2013 | Tanaka | G10L 21/06 704/275 |
| 2013/0279393 | A1* | 10/2013 | Rubin | H04J 3/1694 370/312 |
| 2013/0301406 | A1* | 11/2013 | Sakata | G08G 1/092 370/229 |
| 2014/0002276 | A1* | 1/2014 | Iyer | H04W 4/22 340/901 |
| 2014/0278029 | A1* | 9/2014 | Tonguz | G08G 1/087 701/117 |
| 2014/0354451 | A1* | 12/2014 | Tonguz | G08G 1/096716 340/905 |
| 2015/0070193 | A1* | 3/2015 | Anschutz | H04W 8/005 340/903 |

FOREIGN PATENT DOCUMENTS

| | | | |
|---|---|---|---|
| JP | 2005038202 A | * | 2/2005 |
| WO | 2008141305 A1 | | 11/2008 |

OTHER PUBLICATIONS

Rita—U.S. Department of Transportation, Vehicle-to-Vehicle (V2V) Communications for Safety, http://www.its.dot.gov/research/v2v.htm, Last updated Mar. 18, 2014.
Viknesh Vijayenthiran, Six Cities Named for New-Vehicle-To-Vehicle (V2V) Communications Trials, http://www.motorauthority.com/news/1060101_six-cities-named-for-new-vehicle-to-vehicle-v2v-communications-trials, May 17, 2011.
Wikipedia, Vehicular ad hoc network, http://en.wikipedia.org/wiki/VANET, Last retrieved May 9, 2014.
Wikipedia, Vehicular communication systems, http://en.wikipedia.org/wiki/Vehicular_communication, Last retrieved May 9, 2014.

* cited by examiner

AUTOMOTIVE DYNAMIC VIRTUAL NETWORK

FIELD

The subject matter disclosed herein relates to vehicle-to-vehicle networks and more particularly relates to a vehicle-to-vehicle network that is a dynamic virtual network.

BACKGROUND

The automotive industry has made great strides in terms of passenger safety over the years. Improvements have been made to vehicle fuselages to be able to better absorb crash impact while protecting vehicle occupants. Seatbelts, airbags, safety glass, antilock brakes and a whole host of other vehicle safety features have reduced mortality and injury rates among drivers and passengers. Vehicles also include a variety of sensors that can detect abnormal conditions in a vehicle as well as abnormal conditions around the vehicle, such as abrupt stopping of a vehicle ahead of a user's vehicle. However, accidents happen and vehicle occupants are still injured and killed.

BRIEF SUMMARY

An apparatus for a dynamic vehicle-to-vehicle network is disclosed. A method also performs the functions of the apparatus. A dynamic vehicle-to-vehicle network apparatus includes a vehicle position module, in one embodiment, that determines a position of each proximal vehicle with respect to a user's vehicle. Each proximal vehicle includes one or more vehicles traveling in a same direction as the user's vehicle and within a sensor range. Each proximal vehicle is positioned in relation to the user's vehicle without another vehicle between the proximal vehicle and the user's vehicle. The apparatus includes, in one embodiment, a vehicle network module that establishes a communication link between the user's vehicle and one or more of the proximal vehicles. The apparatus includes, in one embodiment, a message receiver module that receives an alert message from a front proximal vehicle that is in front of the user's vehicle in response to a proximal vehicle traveling in front of the user's vehicle and in response to the front proximal vehicle sending the alert message.

In one embodiment, the apparatus includes a message transmitter module that transmits an alert message to a rear proximal vehicle that is traveling behind the user's vehicle in response to a proximal vehicle traveling behind the user's vehicle. The alert message transmitted by the message transmitter module includes an alert message received from a front proximal vehicle and/or an alert message generated within the user's vehicle. The apparatus includes, in one embodiment, an alert action module that takes an action with respect to the user's vehicle in response to receiving an alert message from a front proximal vehicle.

In one embodiment, an alert message received by the message receiver module includes an alert message from a front proximal vehicle and/or an alert message received by the front proximal vehicle from another vehicle ahead of the front proximal vehicle and the apparatus may include a message priority module that prioritizes alert messages received by the message receiver module based on a proximity of the vehicle where the alert message originated to the user's vehicle, where an alert message generated by a front proximal vehicle has a higher priority than an alert message received by a front proximal vehicle and passed to the user's vehicle. In another embodiment, the alert action module takes actions with respect to the user's vehicle that differ based on alert message priority and/or a type of alert message. In another embodiment, the message priority module further prioritizes alert messages by how many vehicles are between a vehicle sending an alert message and the user's vehicle, where an alert message from a vehicle closer to the user's vehicle has a higher priority than an alert message from a vehicle further away from the user's vehicle. In a further embodiment, a vehicle being closer to or further away from the user's vehicle is based on a number of vehicles away from the user's vehicle. In another embodiment, the message priority module reduces priority of an alert message received from the front proximal vehicle prior to the message transmitter module transmitting the alert message to a rear proximal vehicle.

In one embodiment, the message receiver module rejects alert messages sent directly from vehicles other than a proximal vehicle. In another embodiment, the vehicle position module further determines a position of each proximal vehicle using a global positioning satellite ("GPS") system, short range radio frequency ("RF"), directional short range radar, infrared, and/or laser light. In another embodiment, the apparatus includes an alert generation module that generates an alert message based on information from one or more sensors of the user's vehicle. In a further embodiment, the one or more sensors of the user's vehicle sense a condition within the user's vehicle indicative of a crash, a condition within the user's vehicle indicative of abnormal maneuvering of the user's vehicle, a condition within the user's vehicle indicative a failure of a component of the user's vehicle, and/or an object and/or condition in an area surrounding the user's vehicle indicative of a danger to the vehicle, a situation for emergency maneuvering of the user's vehicle, and/or an impending crash.

In one embodiment, the action taken by the alert action module includes alerting a driver of the user's vehicle and/or taking an action that affects control of the user's vehicle. In another embodiment, the front proximal vehicle includes a vehicle traveling in a same lane as the lane that the user's vehicle is traveling and ahead of the user's vehicle, and/or a proximal vehicle in a lane different than the lane that the user's vehicle is traveling and further ahead than the user's vehicle. In another embodiment, the vehicle network module establishes the communication link between the user's vehicle and the one or more proximal vehicles via a wireless ad hoc network.

In one embodiment, the apparatus includes a message limit module that prevents an alert message received from a front proximal vehicle that has been transmitted through more than N vehicles before being transmitted to the user's vehicle from being transmitted to a rear proximal vehicle, where N is an integer and where N is a message travel limit expressed as a number of vehicles from the user's vehicle. In another embodiment, one or more of the proximal vehicles include the apparatus and a proximal vehicle with the apparatus transmits an alert message to a rear proximal vehicle behind the proximal vehicle with the apparatus, which includes the user's vehicle. The transmitted alert message includes an alert received from a front proximal vehicle in front of the proximal vehicle with the apparatus or an alert message generated by the proximal vehicle with the apparatus and where the vehicle network module of the user's vehicle and each proximal vehicle with the apparatus each establishes a wireless ad hoc network with proximal vehicles. In another example, the apparatus includes the user's vehicle.

A method for a dynamic vehicle-to-vehicle network includes determining a position of each proximal vehicle with respect to a user's vehicle. Each proximal vehicle includes one or more vehicles traveling in a same direction as the user's vehicle and within a sensor range, where each proximal vehicle is positioned in relation to the user's vehicle without another vehicle between the proximal vehicle and the user's vehicle. The method, in one embodiment, includes establishing a communication link between the user's vehicle and one or more of the proximal vehicles and receiving an alert message from a front proximal vehicle that is in front of the user's vehicle in response to a proximal vehicle traveling in front of the user's vehicle and in response to the front proximal vehicle sending the alert message. The method, in one embodiment, includes transmitting an alert message to a rear proximal vehicle that is traveling behind the user's vehicle in response to a proximal vehicle traveling behind the user's vehicle. The transmitted alert message includes an alert message received from a front proximal vehicle and/or an alert message generated within the user's vehicle. In one embodiment, the method includes taking an action with respect to the user's vehicle in response to receiving an alert message from a front proximal vehicle.

In one embodiment, an alert message received from a front proximal vehicle includes an alert message from the front proximal vehicle and/or an alert message received by the front proximal vehicle from another vehicle ahead of the front proximal vehicle and the method includes prioritizing alert messages received from a front proximal vehicle based on a proximity of the vehicle where the alert message originated to the user's vehicle. An alert message generated by a front proximal vehicle has a higher priority than an alert message received by a front proximal vehicle and passed to the user's vehicle. In another embodiment, the method includes generating an alert message based on information from one or more sensors of the user's vehicle.

A second apparatus for a dynamic vehicle-to-vehicle network includes, in one embodiment, a vehicle position module that determines a position of each proximal vehicle with respect to a user's vehicle. Each proximal vehicle includes one or more vehicles traveling in a same direction as the user's vehicle and within a sensor range, where each proximal vehicle is positioned in relation to the user's vehicle without another vehicle between the proximal vehicle and the user's vehicle. The second apparatus, in one example, includes a vehicle network module that establishes a communication link between the user's vehicle and one or more of the proximal vehicles via a wireless ad hoc network, and may include a message receiver module that receives an alert message from a front proximal vehicle that is in front of the user's vehicle in response to a proximal vehicle traveling in front of the user's vehicle and in response to the front proximal vehicle sending the alert message, where an alert message received by the message receiver module includes an alert message from the front proximal vehicle and/or an alert message received by the front proximal vehicle from another vehicle ahead of the front proximal vehicle.

The second apparatus, in one embodiment, includes a message priority module that prioritizes alert messages received by the message receiver module based on a proximity of the vehicle where the alert message originated with the user's vehicle, where an alert message generated by the front proximal vehicle has a higher priority than an alert message received by the front proximal vehicle and passed to the user's vehicle. The second apparatus, in one embodiment, includes a message limit module that prevents an alert message received from the front proximal vehicle that has been transmitted through more than N vehicles before being transmitted to the user's vehicle from being transmitted to a rear proximal vehicle, where N is an integer and where N is a message travel limit expressed as a number of vehicles from the user's vehicle. The second apparatus, in one example, includes an alert generation module that generates an alert message based on information from one or more sensors of the user's vehicle. The second apparatus may also include a message transmitter module that transmits an alert message to a rear proximal vehicle that is traveling behind the user's vehicle in response to a proximal vehicle traveling behind the user's vehicle, where the alert message transmitted by the message transmitter module includes an alert message received from a front proximal vehicle and/or an alert message generated within the user's vehicle by the alert generation module. The second apparatus, in one embodiment, includes an alert action module that takes an action with respect to the user's vehicle in response to receiving an alert message from a front proximal vehicle.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
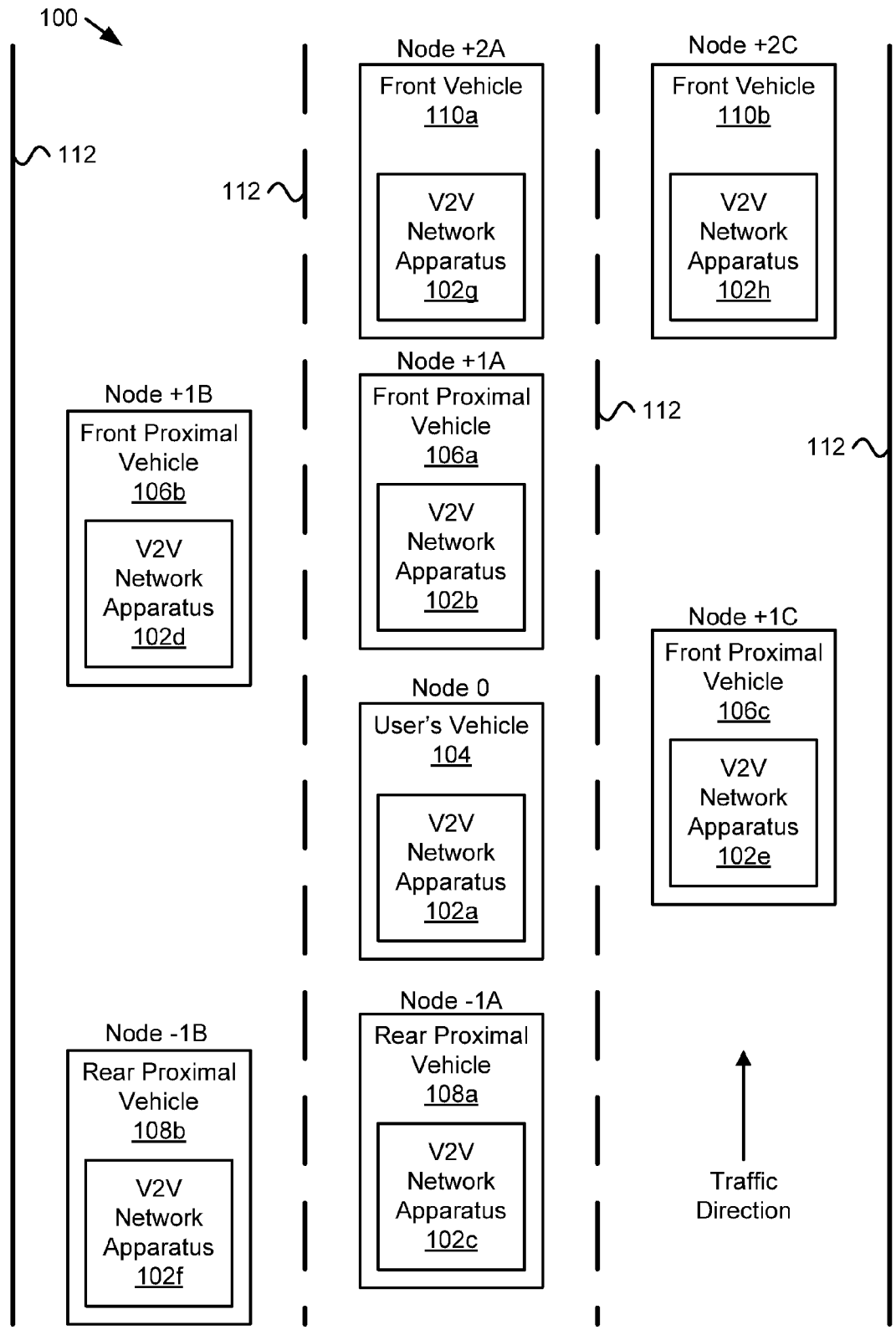
FIG. 1 is a schematic block diagram illustrating one embodiment of a system for vehicle to vehicle alert communication in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed and executed through either a remote-access or a site-to-site VPN. When using the remote-access VPNs the computer program product is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating one embodiment of a system 100 for vehicle to vehicle alert communication in accordance with one embodiment of the present invention. The system 100 includes a vehicle-to-vehicle network apparatus 102a in a user's vehicle 104 along with vehicle to vehicle network apparatuses 102b-h in other vehicles, including front proximal vehicles 106a-c, rear proximal vehicles 108a-b, and front vehicles 110a-b, which are described below.

The system 100 includes vehicle to vehicle ("V2V") network apparatuses 102a-h (collectively or individually "102") in multiple vehicles 104, 106a-c (collectively or individually "106"), 108a-b (collectively or individually "108"), 110a-b (collectively or individually "110"). In one embodiment, each vehicle 104, 106a-c, 108a-b, 110a-b includes a V2V network apparatus 102. In another embodiment, the user's vehicle 104 and some vehicles 106, 108, 110 traveling near the user's vehicle 104 include the V2V network apparatus 102. FIG. 1 depicts a typical roadway with lane striping 112 with the vehicles 104, 106a-c, 108a-b, 110a-b traveling in the direction shown.

Typically, each V2V network apparatus 102 establishes a communication link with each proximal vehicle with a V2V network apparatus 102. A proximal vehicle, as used herein, is a vehicle positioned with respect to the user's vehicle 104 with no other vehicles between the proximal vehicle and the user's vehicle 104. For example, the front proximal vehicle 106a in the lane of the user's vehicle 104 is a proximal vehicle with regard to the user's vehicle 104 because there are no other vehicles between the front proximal vehicle 106 and the user's vehicle 104. As depicted in FIG. 1, in addition, the rear proximal vehicles 108a, 108b are proximal vehicles and the front proximal vehicles 106b, 106c in lanes outside the lane of the user's vehicle 104 are also proximal vehicles but the front vehicles 110a, 110b are not proximal vehicles because other vehicles (e.g. 106a, 106c) are between the user's vehicle 104 and the front vehicles 110a, 110b.

Note that while the front proximal vehicle 106c right of the user's vehicle 104 is not directly between the user's vehicle 104 and the front vehicle 110b in the same lane, because the front proximal vehicle 106c is in a position to be a proximal vehicle, the front vehicle 110b in the same lane is not a proximal vehicle. If the front proximal vehicle 106c right of the user's vehicle 104 slows so the user's vehicle 104 moves ahead, the front vehicle 110b may become a proximal vehicle.

Vehicles that may be traveling in lanes other than the lane of the user's vehicle 104, in one embodiment are not included in communications with the V2V network apparatus 102. In the embodiment, the V2V network apparatus 102a establishes a communication link and receives and passes back alert messages within the lane of travel of the user's vehicle 104. In another embodiment, the V2V network apparatus 102a of the user's vehicle establishes a communication link with vehicles in lanes other than the lane the user's vehicle 104 is traveling in addition to the vehicles in the lane of the user's vehicle 104. For example, the V2V network apparatus 102a establishes a communication link and receives messages from the front proximal vehicles 106a-c and passes back alert messages to rear proximal vehicles 108a-b.

For vehicles traveling to the side of the user's vehicle (e.g. 106c), a standard may be established regarding the position of the vehicle before considering the vehicle a front proximal vehicle 106c where messages are passed to the user's vehicle 104. For example, vehicles positioned to the side of the user's vehicle 104 that may swerve or otherwise become a hazard to the user's vehicle 104 may be considered a "front" proximal vehicle 106c that passes messages to the user's vehicle 104 but vehicles further back may be considered "rear" proximal vehicles that receive messages from the user's vehicle 104. Distance from the user's vehicle 104, may also be considered with respect to alert message transfer. For example, a vehicle traveling in front of a user's vehicle 104, but beyond a certain distance may not be considered a front proximal vehicle 106 even if there are not other vehicles between the vehicle and the user's vehicle 104. Likewise, a vehicle traveling behind the user's vehicle 104 but beyond a distance limit may not be considered a rear proximal vehicle 108 and/or may not receive alert messages from the user's vehicle 104. The V2V network apparatus 102 is discussed in more detail with regards to the apparatuses 200, 300 of FIGS. 2 and 3.

Figure 2:
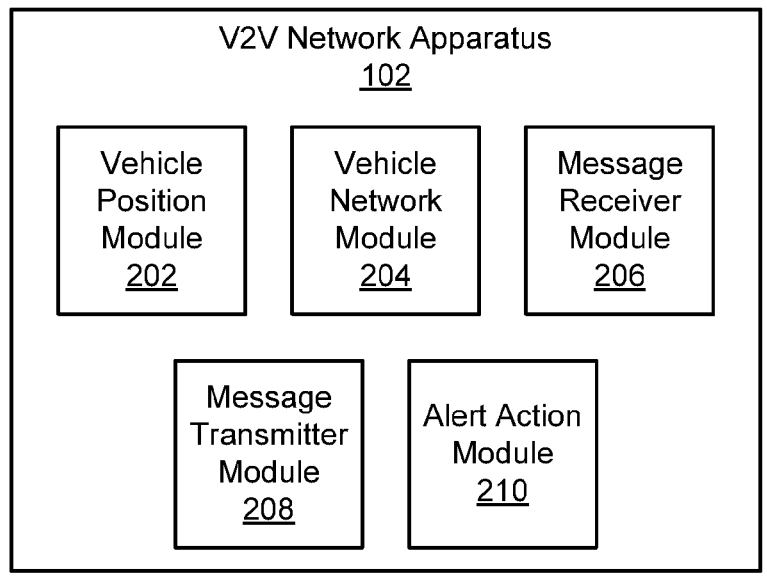
FIG. 2 is a schematic block diagram illustrating one embodiment of an apparatus for vehicle to vehicle alert communication in accordance with one embodiment of the present invention.

FIG. 2 is a schematic block diagram illustrating one embodiment of an apparatus 200 for vehicle to vehicle alert communication in accordance with one embodiment of the present invention. The apparatus 200 includes one embodiment of a V2V network apparatus 102 with a vehicle position module 202, a vehicle network module 204, a message receiver module 206, a message transmitter module 208 and an alert action module 210, which are described below. In one embodiment, multiple vehicles include an embodiment of the V2V network apparatus 102 and each provides information to other vehicles with the V2V network apparatus 102 so that each vehicle may establish an ad hoc vehicle-to-vehicle network.

In one embodiment, the apparatus 200 includes a vehicle position module 202 that determines a position of each proximal vehicle 106a-c, 108a-b, with respect to a user's vehicle 104. Each proximal vehicle 106a-c, 108a-b includes one or more vehicles traveling in a same direction as a user's vehicle 104 and within a sensor range. Each proximal vehicle 106a-c, 108a-b is positioned in relation to the user's vehicle 104 without another vehicle between the proximal vehicle (e.g. 106a) and the user's vehicle 104.

The vehicle position module 202, in one embodiment, includes one or more sensors that determine a position of vehicles around the user's vehicle 104, and may determine if a vehicle has other vehicles between the user's vehicle and the vehicle being sensed. The vehicle position module 202 may use one or more sensing technologies for determining position of vehicles.

For example, the vehicle position module 202 may use a global positioning satellite ("GPS") system. The vehicle position module 202 may use GPS to determine a location of the user's vehicle 104 as well as surrounding vehicles to determine one or more proximal vehicles 106a-c, 108a-b and other vehicles (e.g. 110a-b). In another example, the vehicle position module 202 may use short range radio frequency ("RF") technology, such as RF identification ("RFID") technology, to determine a location of the user's vehicle 104 with relation to surrounding vehicles. In one instance, vehicles may have an RFID tag that transmits an identifier either continuously or in response to a request.

In another embodiment, the vehicle position module 202 may use directional short range radar, infrared ("IR") transmitters/sensors, laser light, etc. that may determine positioning of vehicles around the user's vehicle 104 and may determine a location of the vehicles around a user's vehicle 104 without the vehicles around the user's vehicle 104 transmitting a signal. For example, the vehicle position module 202 may determine a position of proximal vehicles 106a-c, 108a-b and other vehicles that do not have a V2V network apparatus 102. The vehicle position module 202 may send out a signal in a particular direction, such as a radar, IR, laser, etc. signal and may detect a vehicle position based on direction of the signal that was transmitted along with information from a reflected waveform. For example, the vehicle position module 202 may use timing of transmitted and subsequent received waveforms to determine a distance to a vehicle. One of skill in the art will recognize other ways for the vehicle position module 202 to determine a position of one or more vehicles with respect to the user's vehicle 104.

The apparatus 200, in one embodiment, includes a vehicle network module 204 that establishes a communication link between the user's vehicle and one or more of the proximal vehicles 106, 108. For example, the vehicle network module 204 may establish a communication link between the user's vehicle 104 and proximal vehicles 106, 108 without establishing a communications link with other vehicles 110 that are not proximal vehicles 106, 108. In one embodiment, the vehicle network module 204 establishes a communication link with proximal vehicles (e.g. 106a, 108a) in the same lane as the user's vehicle 104. In another embodiment, the vehicle network module 204 establishes a communication link with proximal vehicles (e.g. 106a, 108a) in the same lane as the user's vehicle 104 and proximal vehicles (e.g. 106b, 106c, 108b) in other lanes. The vehicle network module 204 may establish a communication link that forms a wireless ad hoc network between the proximal vehicles 106, 108 and the user's vehicle 104.

In one embodiment, the vehicle network module 204 in the V2V network apparatus 102a of the user's vehicle forms one ad hoc network while each of vehicles 106, 108, 110 around the user's vehicle 104 each form a separate ad hoc network. Each vehicle 104, 106, 108, 110 receives and passes alert messages as described below. Other vehicles around the user's vehicle 104 may be present that do not have a V2V network apparatus 102 and may not form an ad hoc network, but may be tracked by the vehicle position module 202.

The vehicle network module 204 may include a mobile ad hoc network ("MANET") and may be a continuously self-configuring, infrastructure-less network connected without wires. A MANET typically has mobile devices, or in embodiments of the present invention, vehicles that continually move in and out of range of other vehicles. Each vehicle network module 204 may forward traffic unrelated to its own use or may use received information and pass on data. The vehicle network module 204 may establish a routable networking environment on top of a link layer ad hoc network. The MANET may be a peer-to-peer, self-forming, self-healing network. In one embodiment, the ad hoc network may also be called a Vehicular Ad hoc Network ("VANET") with the features of the MANET and may be an intelligent VANET ("InVANET") that may assist the vehicles 104, 106, 108 110 avoid collisions, accidents, etc.

In one embodiment, the vehicle network module 204 may employ transmission control protocol/internet protocol ("TCP/IP") or similar protocol and may use a routing protocol typical of ad hoc networks. For example, the vehicle network module 204 may use a table-driven routing protocol, such as the Destination Sequenced Distance Vector Algorithm ("DSDV") protocol, ClusterHead Gateway Switch Routing, Wireless Routing Protocol, Destination-Sequenced Distance-Vector Routing ("DSDV"), etc. or an on-demand routing protocol, such as Ad hoc On-demand Distance Vector Routing ("AODV"), Dynamic Source Routing Protocol ("DSRP"), Temporally Ordered Routing Algorithm ("TORA"), Associativity Based Routing ("ABR"), Signal Stability Routing ("SSR"), etc.

In one embodiment, the vehicle network module 204 uses broadcast or direct line-of-site networks or both for establishing communication links. One example of a direct line-of-sight network may include low-power laser light, such as a light-emitting diode ("LED") laser. For example, a low power LED laser may communicate directly, where the laser may instruct a receiving car to respond with an RF burst (e.g., giving the vehicle's virtual ID). Thus, while several vehicles may be sending a virtual ID signal via RF, the vehicle network module 204 may ascertain which vehicle is a proximal vehicle 106, 108 via synchronizing RF ID broadcasts with laser instructions sent within a time limit. In one embodiment, the vehicle identification process may be accomplished in less than a second or a similar time limit. Lasers may be directed in front, to each side and/or behind a user's vehicle 104. Thus, the low power laser may be used by the vehicle position module 202 to identify proximal vehicles 106, 108 and to communicate. A single laser may be used and may rotate or may direct laser light in multiple directions or a plurality of lasers may be set up for various directions. Other direct transmissions (i.e. directed in a specific direction or to a specific vehicle) may also be used in combination with indirect transmissions.

In various embodiments, the vehicle network module 204 may use a typical wireless communication protocol, such as an Institute of Electrical and Electronics Engineers ("IEEE") 802.11 protocol, Bluetooth®, ANT+®, a cellular protocol such as Long Term Evolution ("LTE"), 3G, etc. One of skill in the art will recognize other ways for the vehicle network module 204 to establish a communication link between vehicles.

In one embodiment, the apparatus 200 includes a message receiver module 206 that receives an alert message from a front proximal vehicle 106 that is in front of the user's vehicle 104 in response to a proximal vehicle 106 traveling in front of the user's vehicle and in response to the front proximal vehicle 106 sending the alert message. For example, a message sent from a vehicle (e.g. 108, 110) that is not a front proximal vehicle 106 may be ignored. In one embodiment, the message receiver module 206 receives alert messages from the front proximal vehicle 106a that is in the same lane as the user's vehicle 104. In another embodiment, the message receiver module 206 receives alert messages from the front proximal vehicle 106a that is in the same lane as the user's vehicle 104 or from other front proximal vehicles 106b, 106c that are not in the same lane as the user's vehicle 104. In one embodiment, the message receiver module 206 receives alert messages from a front proximal vehicle 106 that is within a network range or other distance limit. For example, the message receiver module 206 may ignore or be unable to receive an alert message from a front proximal vehicle 106 beyond the network range or beyond a distance limit.

An alert message is a message that is relevant to safety of the user and performance of surrounding vehicles 106, 108, 110 that may affect the user. For example, if a vehicle ahead of the user's vehicle blows a tire, deploys an airbag, breaks hard, etc., this action may affect the user and the user's vehicle 104. Information in the form of an alert message and related to blowing a tire, deploying an airbag, breaking hard, etc. may be passed to the a vehicle behind the vehicle where these actions originated. The alert message may then be passed to or originate in a front proximal vehicle 106 which may then send the alert message to the user's vehicle 104 and the message receiver module 206 may receive the alert message. Information passed in an alert message may include alarms or alerts in a vehicle, a condition indicative of a crash, a condition indicative of abnormal maneuvering, such as quickly turning a steering wheel or hard braking, a condition indicative of a failure within a vehicle, an object or a condition in an area surrounding the vehicle indicative of danger to a vehicle, a situation for emergency maneuvering, an impending crash, and the like.

In one embodiment, an alert message may include an identifier. In one embodiment, the identifier is unique. In another embodiment, the identifier may include a timestamp or other mechanism to assist the V2V network apparatus 102 to not duplicate a message received from multiple front proximal vehicles 106. In another embodiment, the identifier may identify an alert message type. One of skill in the art will recognize other information to be included in an alert message.

In one embodiment, alert messages from vehicles other than from a front proximal vehicle 106 are rejected by the message receiver module 206. For example, alert messages from vehicles behind or to the side of the user's vehicle, alert messages from vehicles in lanes not adjacent to the user's vehicle, or alert messages from vehicles 110 ahead of the front proximal vehicle(s) 106 may be rejected. The message receiver module 206 may reject messages from vehicles 110 ahead of the front proximal vehicle(s) 106 to have an orderly system of passing messages from vehicle to vehicle as described herein where messages are passed to a vehicle directly behind a vehicle passing the message.

An alert message may be in a form that is compatible with the ad hoc network established by the vehicle network module 204. For example, the alert message may be in a digital format with a header and data. The header may include metadata with relevant information. For example, a message transmitter module 208 may transmit an alert message that includes an identifier that identifies the vehicle where the alert message originated. The identifier may be a vehicle identification number ("VIN") or other unique identifier. In another embodiment, the vehicle network module 204 assigns an identification number to each proximal vehicle 106, 108 and the message receiver module 206 associates a received alert message with the identifier assigned by the vehicle network module 204. Alert messages received first by a front proximal vehicle 106 and passed on to the user's vehicle 104 may include information related to how many times the alert message was passed. One or skill in the art will recognize various data formats for the alert message and information that may be passed with the alert message, for example as metadata or in the body of the alert message.

In one embodiment, the message receiver module 206 receives an alert message that originated in a roadway beacon, in an emergency vehicle, in a police vehicle, etc. A roadway beacon may be part of signage, may be from a transmitter along the roadway, may be from a satellite, airplane, etc. The alert message may be received directly by the message receiver module 206 or may be passed to the message receiver module 206 from a front proximal vehicle 106. The alert message may be a general message to travelers, may alert the user of road conditions, may pass public safety information, or other information known by those of skill in the art.

In one embodiment, the apparatus 200 includes a message transmitter module 208 that transmits an alert message to a rear proximal vehicle 108 that is traveling behind the user's vehicle 104 in response to a proximal vehicle 108 traveling behind the user's vehicle 104 and/or within a distance limit or network range. The alert message transmitted by the message transmitter module 208 may be an alert message received from a front proximal vehicle 106 and/or an alert message generated within the user's vehicle 104. Alert messages generated within the user's vehicle 104 are discussed in further detail with respect to the apparatus 300 of FIG. 3. The message transmitter module 208, in one embodiment, transmits the alert message to the rear proximal vehicle 108a in the lane of the user's vehicle. In another embodiment, the message transmitter module 208 transmits the alert message to rear proximal vehicles 108 in the lane of the user's vehicle 104 or other adjacent lanes.

In one embodiment, the message transmitter module 208 transmits the alert message as quickly as possible. Due to the nature of an alert message, transmission of the alert message quickly allows more time for the drivers of the rear proximal vehicles 108a-b or vehicles behind the rear proximal vehicles 108a-b to react to the alert message.

In one embodiment, the apparatus 200 includes an alert action module 210 that takes an action with respect to the user's vehicle 104 in response to receiving an alert message from the front proximal vehicle 106. For example, the alert action module 210 may display an alert to the driver or occupants of the user's vehicle 104 or may generate an audible message within the user's vehicle 104. In another embodiment, the alert action module 210 may cause an action within the user's vehicle that affects control of the user's vehicle or causes some other action related to safety of the occupants of the user's vehicle 104. For example, the alert action module 210 may initiate braking of the user's vehicle before the driver of the user's vehicle 104 is able to detect danger. Other actions are possible, such as steering away from a crash, deploying airbags, decreasing fuel to the engine of the user's vehicle 104, etc. One of skill in the art will recognize other ways for the alert action module 210 to take action based on a received alert message.

Figure 3:
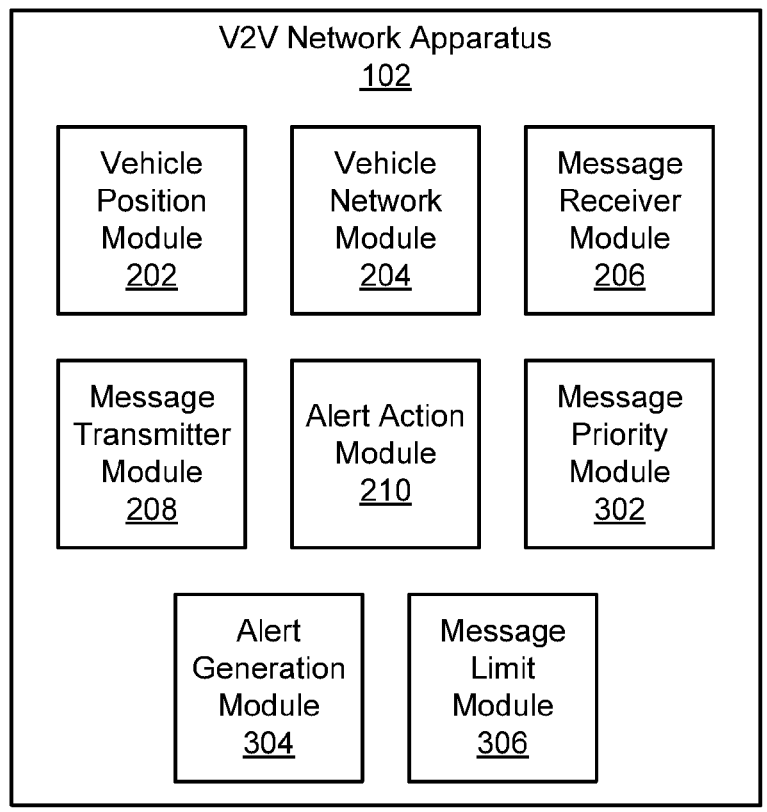
FIG. 3 is a schematic block diagram illustrating one embodiment of another apparatus for vehicle to vehicle alert communication in accordance with one embodiment of the present invention.

FIG. 3 is a schematic block diagram illustrating one embodiment of another apparatus 300 for vehicle to vehicle alert communication in accordance with one embodiment of the present invention. The apparatus 300 includes another embodiment, of a V2V network apparatus 102 with a vehicle position module 202, a vehicle network module 204, a message receiver module 206, a message transmitter module 208 and an alert action module 210, which are substantially similar to those described above in relation to the apparatus 200 of FIG. 2. The apparatus 300 may also include, in various embodiments, a message priority module 302, an alert generation module 304, and/or a message limit module 306, which are described below.

In one embodiment, the apparatus 300 includes a message priority module 302 that prioritizes alert messages received by the message receiver module 206 based on a proximity of the vehicle where the alert message originated to the user's vehicle 104, such that an alert message generated by a front proximal vehicle 106 has a higher priority than an alert message received by the front proximal vehicle 106 and passed to the user's vehicle 104. The alert message received by the message receiver module 206 may be an alert message from a front proximal vehicle 106 and an alert message received by a front proximal vehicle 106 from another vehicle (e.g. 110) ahead of the front proximal vehicle 106.

In one embodiment, alert action module 210 takes actions with respect to the user's vehicle 104 that differ based on alert message priority and/or a type of alert message. For example, the alert action module 201 may take different action in response to the message receiver module 206 receiving a particular alert message, such as hard braking by a vehicle ahead of the user's vehicle 104, based on priority. For example, where the message originated in a vehicle 110a in the lane of the user's vehicle 104 and ahead of the front proximal vehicle 106a in the lane of the user's vehicle 104, the alert action module 210 may not take action or may take different action than if the alert message originated in the front proximal vehicle 106a. For instance, the alert action module 210 may initiate braking where the alert message originated in the front proximal vehicle 106a and may just issue a warning, audibly or visually, where the alert message originated in the vehicle 110a ahead of the front proximal vehicle 106a. In addition, the action may differ depending on distance between the user's vehicle 104 and a front proximal vehicle 106 sending the alert message.

In another embodiment, the alert action module 210 takes different actions based on different types of alert messages. For example, the alert action module 210 may take a more severe action if a received alert message is indicative of a crash than if the received alert message is for hard braking. In another embodiment, the alert action module 210 may take different actions based on distance to a vehicle generating the alert message or transmitting the alert message and the user's vehicle 104. For example, if a front proximal vehicle 106 brakes hard, the alert action module 210 may take action if the front proximal vehicle 106 is within a certain distance. One of skill in the art will recognize various actions that may be taken by the alert action module 210 based on differing alert messages.

In one embodiment, the message priority module 302 prioritizes alert messages by how many vehicles are between a vehicle sending an alert message and the user's vehicle 104. For example, an alert message from a vehicle closer to the user's vehicle 104 has a higher priority than an alert message from a vehicle further away from the user's vehicle 104. In one example, a vehicle being closer to or further away from the user's vehicle 104 is based on a number of vehicles away from the user's vehicle 104 in contrast to a distance measured in a unit of length, such as feet or meters. In another embodiment, the message priority module 302 may consider distance in addition to a number of vehicles away from the user's vehicle 104.

In one embodiment, the message priority module 302 reduces priority of an alert message received from the front proximal vehicle 106 prior to the message transmitter module 208 transmitting the alert message to a rear proximal vehicle 108 behind the user's vehicle 104. For example, if message priority is given a numerical value between 1 and 4, the alert message may be a priority 4 when generated. The alert message with a priority 4 may be transmitted by a message transmitter module 208 and the message priority module 302 of the rear proximal vehicle receiving the priority 4 message may reduce the priority to a priority 3 before the message transmitter module 208 of that vehicle transmits the alert message to another rear proximal vehicle. This message priority module 302 of the next vehicle may reduce the priority of the alert message to a priority 2, and this reduction may continue as the alert message is passed. In one embodiment, certain types of alert messages are not reduced in priority, such as alerts from an emergency vehicle, from law enforcement, from a roadside beacon, etc. In another embodiment, the message priority module 302 may reduce priority based on distance. For example, a priority 4 alert may be reduced to a priority 3 alert if the front proximal vehicle 106 sending the alert message is a certain distance from the user's vehicle 104.

In one embodiment, the apparatus 300 includes an alert generation module 304 that generates an alert message based on information from one or more sensors of the user's vehicle 104. For example, the sensors may be braking sensors, acceleration/deceleration sensors, airbag sensors, motion sensors, and the like. In various embodiments, the sensors may sense a condition within the user's vehicle 104 indicative of a crash, a condition within the user's vehicle 104 indicative of abnormal maneuvering of the user's vehicle, a condition within the user's vehicle 104 indicative a failure of a component of the user's vehicle 104, and/or an object and/or a condition in an area surrounding the vehicle indicative of a danger to the vehicle, a situation for emergency maneuvering of the user's vehicle, and/or an impending crash. The alert generation module 304 may generate an alert message and the message transmitter module 208 may then transmit the alert message to a rear proximal vehicle 108. In addition, the alert action module 210 may take action based on the alert message generated by the alert generation module 304 and the message priority module 302.

In one embodiment, the apparatus 300 includes a message limit module 306 that prevents an alert message received from a front proximal vehicle 106 that has been transmitted through more than N vehicles before being transmitted to the user's vehicle from being transmitted to a rear proximal vehicle, where N is an integer and where N is a message travel limit expressed as a number of vehicles from the user's vehicle 104. For example, if N is 5, alert messages generated six vehicles ahead of the user's vehicle 104 may be prevented from being transmitted by the message transmission module 208 while messages generated no more than five vehicles from the user's vehicle 104 may be received by the message receiver module 206 and acted upon by the alert action module 210 as well as being transmitted to rear proximal vehicles 108. In one embodiment, a message transmitter module 208 may send an alert message that has been passed N times but a real proximal vehicle 108 receiving the alert message may ignore the alert message. In one embodiment, the message limit module 306 may have different limits for different alert messages. For example, a higher priority alert message may have a different message travel limit than a lower priority message. One of skill in the art will recognize other ways for the message limit module 306 to limit alert message transmittal beyond a message travel limit.

Figure 4:
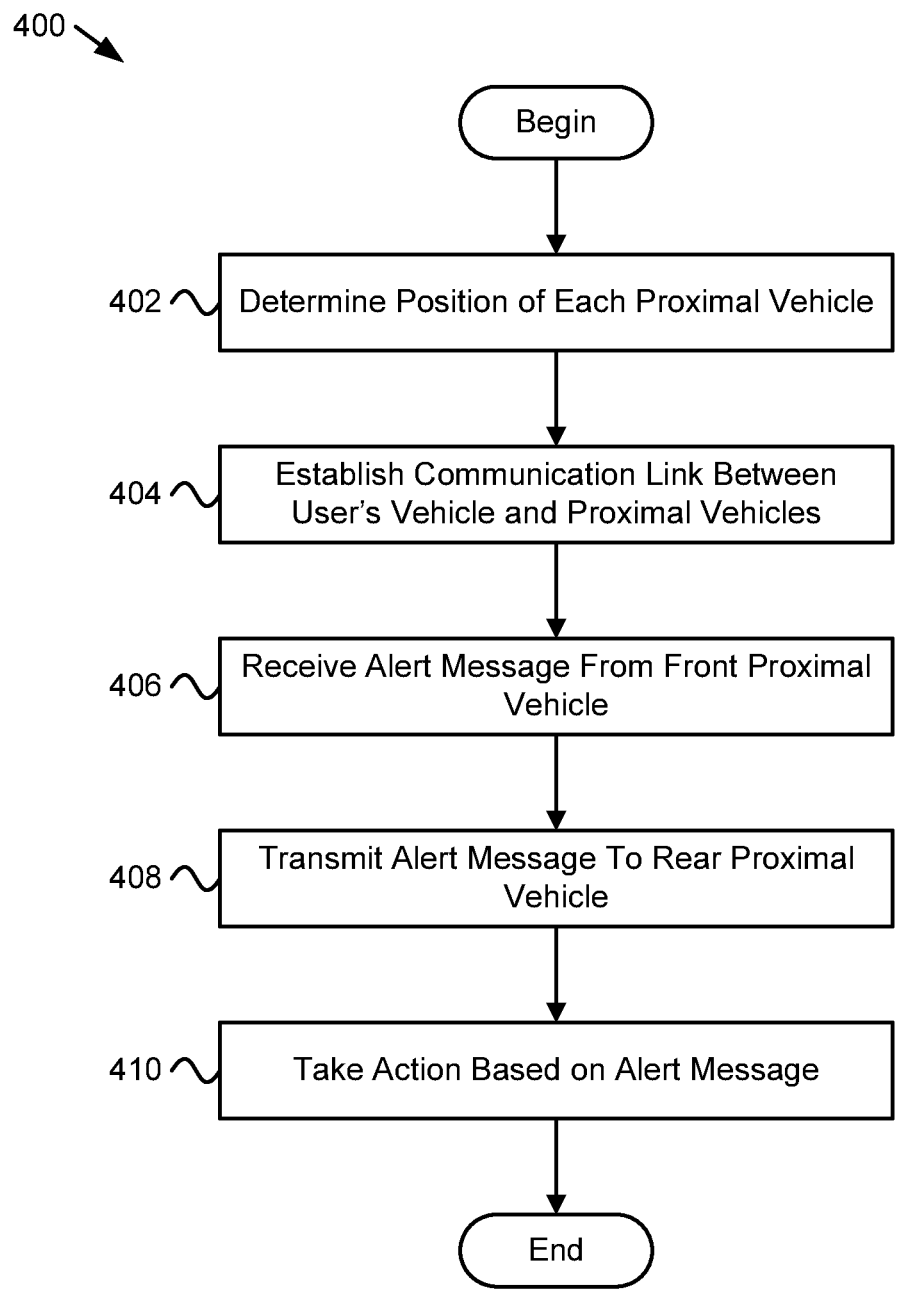
FIG. 4 is a schematic flow chart diagram illustrating one embodiment of a method for vehicle to vehicle alert communication in accordance with one embodiment of the present invention.

FIG. 4 is a schematic flow chart diagram illustrating one embodiment of a method 400 for vehicle to vehicle alert communication in accordance with one embodiment of the present invention. The method 400 begins and determines 402 a position of each proximal vehicle 106, 108 with respect to a user's vehicle 104 where a proximal vehicle 106, 108 is a vehicle traveling a same direction as the user's vehicle 104 and is within a sensor range. In addition, a proximal vehicle 106, 108 does not have any other vehicle between the proximal vehicle 106, 108 and the user's vehicle 104. In one embodiment, the vehicle position module 202 determines 402 a position of each proximal vehicle 106, 108.

The method 400 establishes 404 a communication link between the user's vehicle 104 and one or more of the proximal vehicles 106, 108. For example, the vehicle network module 204 may establish 404 the communication links and may set up an ad hoc network, such as a VANET. The method 400 receives 406 an alert message from a front proximal vehicle 106 in response to the front proximal vehicle 106 sending the alert message. A front proximal vehicle 106 may be a front proximal vehicle 106a traveling in the same lane as the user's vehicle 104 and in front of the user's vehicle 104, or may be a front proximal vehicle 106b, 106c traveling in an adjacent lane. In one embodiment, the message receiver module 206 receives 406 the alert message.

The method 400 transmits 408 an alert message to a rear proximal vehicle 108. The rear proximal vehicle 108 may be a rear proximal vehicle 108a traveling in the same lane as the user's vehicle 104 or a rear proximal vehicle 108b traveling in an adjacent lane. The alert message may originate with the user's vehicle 104 or may be received from a front proximal vehicle 106. In one example, the message transmitter module 208 transmits 408 the alert message. The method 400 takes 410 action with respect to the user's vehicle 104 in response to receiving an alert message from a front proximal vehicle 106, and the method 400 ends. The action may alert the driver or passengers of the user's vehicle 104 and/or may be an action that affects control or driving of the user's vehicle 104. For example, the action may be to apply the brakes of the user's vehicle 104. In one embodiment, the alert action module 210 takes 410 action with respect to the user's vehicle 104.

Figure 5:
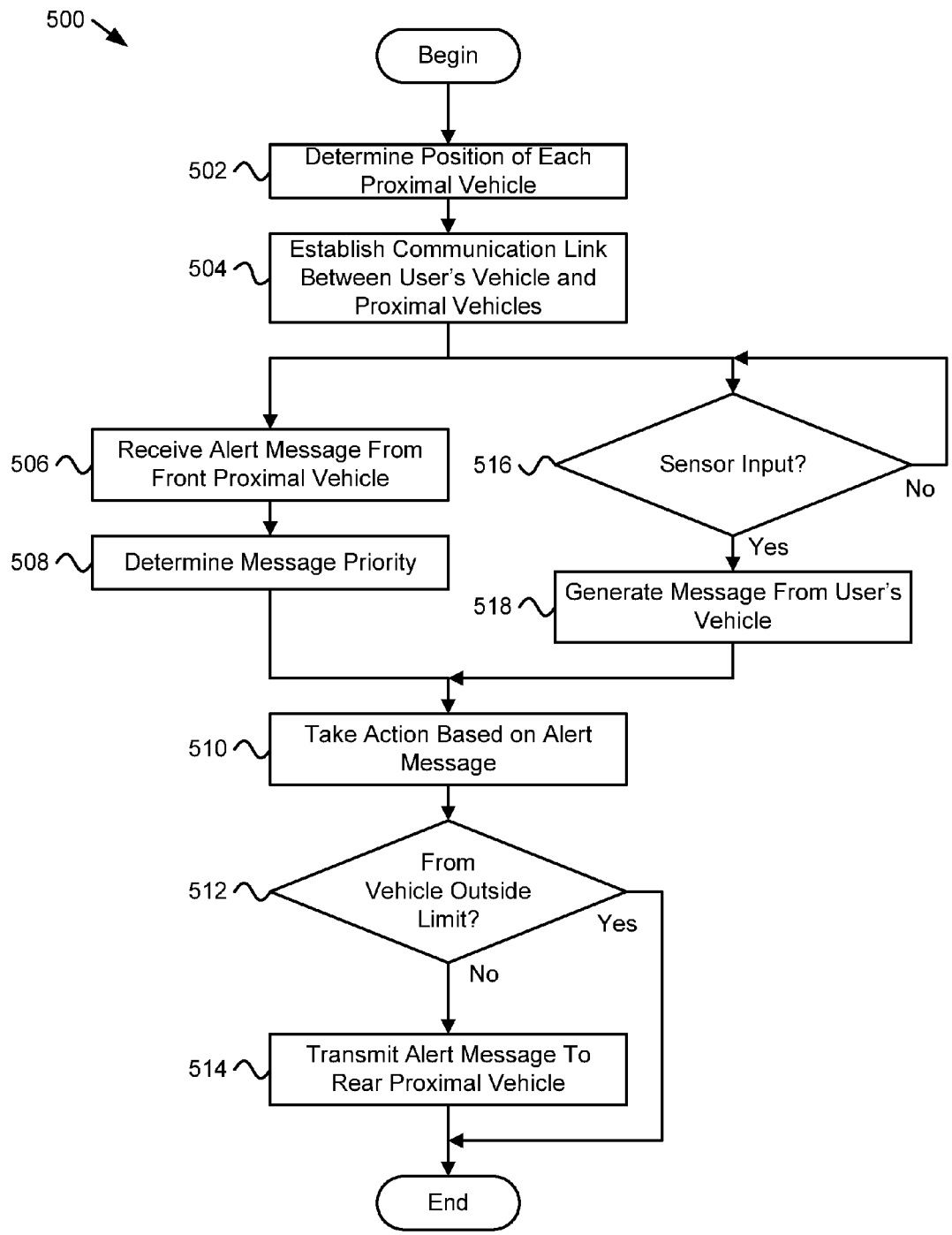
FIG. 5 is a schematic flow chart diagram illustrating one embodiment of another method for vehicle to vehicle alert communication in accordance with one embodiment of the present invention.

FIG. 5 is a schematic flow chart diagram illustrating one embodiment of another method 500 for vehicle to vehicle alert communication in accordance with one embodiment of the present invention. The method 500 begins and determines 502 a position of each proximal vehicle 106, 108 with respect to a user's vehicle 104 where a proximal vehicle 106, 108 is a vehicle traveling a same direction as the user's vehicle 104 and is within a sensor range. The sensor range is for a sensor that senses a location and position of a vehicle with relation to the user's vehicle 104. In one embodiment, the vehicle position module 202 determines 502 a position of each proximal vehicle 106, 108.

The method 500 establishes 504 a communication link between the user's vehicle 104 and one or more of the proximal vehicles 106, 108. In one embodiment, the method 500 assigns a virtual ID to proximal vehicles 106, 108. For example, the vehicle network module 204 may establish 504 the communication links and may set up an ad hoc network. The method 500 receives 506 an alert message from a front proximal vehicle 106 in response to the front proximal vehicle 106 sending the alert message. In one embodiment, the message receiver module 206 receives 506 the alert message.

If the method 500 determines 508 a priority of the alert message and takes 510 action with respect to the user's vehicle 104 based on the alert message and priority of the alert message. In some embodiments, the message priority module 302 determines 508 the priority of the alert message and the alert action module 210 takes 510 action with respect to the user's vehicle 104. The method 500 determines 512 if the alert message is from a vehicle outside a message travel limit. For example, the message limit module 306 may determine 512 if the alert message is from a vehicle outside the message travel limit. If the method 500 determines 512 that the alert message is outside the message travel limit, the method 500 ends. If the method 500 determines 512 that the alert message is from a vehicle that is not outside the message travel limit, the method 500 transmits 514 the alert message to a rear proximal vehicle 108, and the method 500 ends. In one example, the message transmitter module 208 transmits 514 the alert message.

As can be seen in FIG. 5, simultaneous to receiving 506 an alert message and determining 508 priority of the alert message, the method 500 determines 516 if there is sensor input from one or more sensors associated with the user's vehicle 104. The sensors detect an action that would result in generating an alert message. If the method 500 determines 516 that there is no sensor input, the method 500 returns as shown in FIG. 5. If the method 500 determines 516 that there is sensor input, the method 500 generates 518 an alert message and takes 510 action with respect to the user's vehicle 104. In one embodiment, the alert generation module 304 determines 516 if there is sensor input and generates 518 an alert message.

Figure 6:
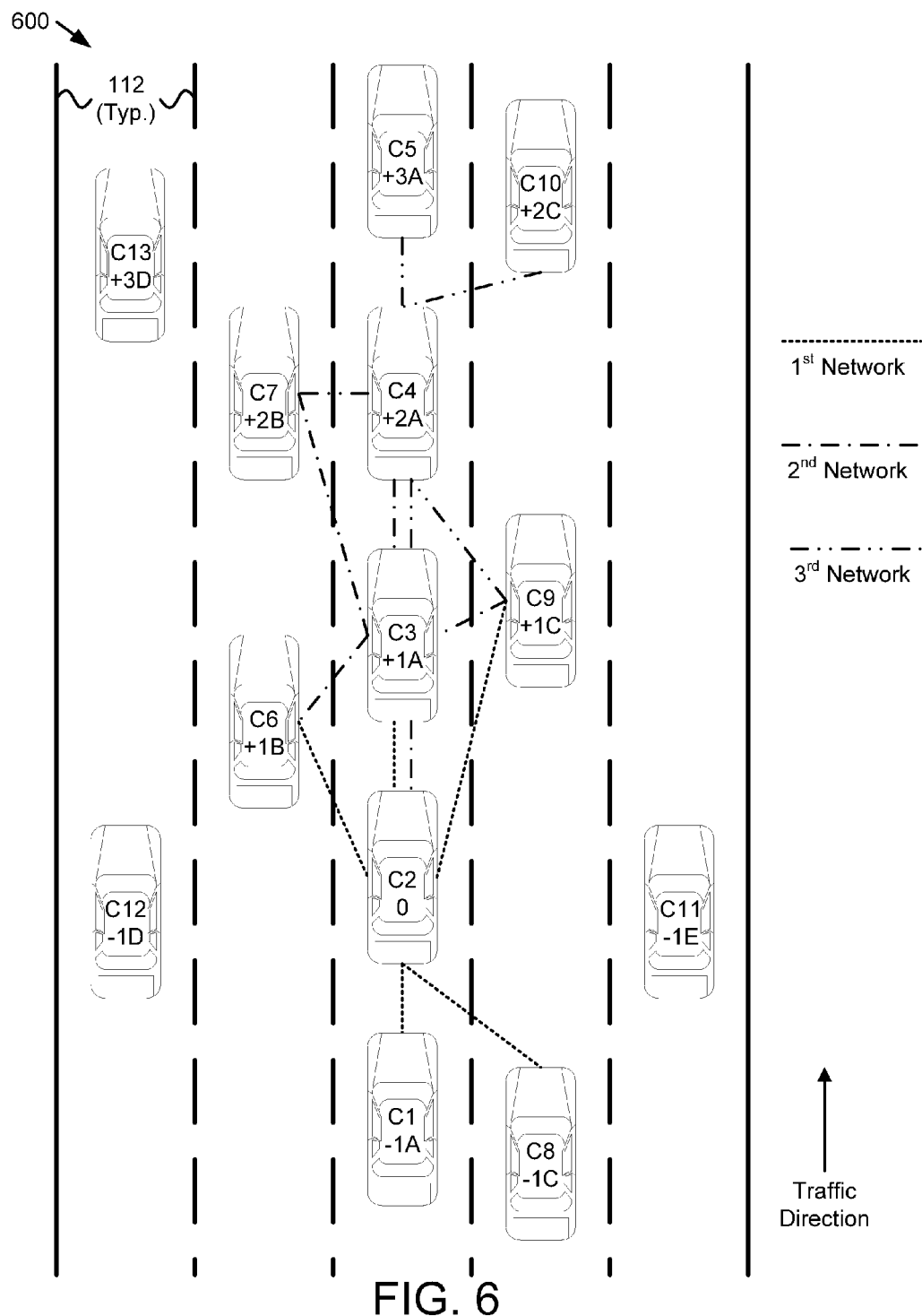
FIG. 6 is a schematic block diagram illustrating one example of vehicle to vehicle alert communication in accordance with one embodiment of the present invention.

FIG. 6 is a schematic block diagram 600 illustrating one example of vehicle to vehicle alert communication in accordance with one embodiment of the present invention. The diagram 600 depicts several vehicles, identified as C1-C13, traveling in a same direction on a roadway with lane striping 112. Each of the vehicles, in one embodiment, includes a V2V network apparatus 102 and establishes an ad hoc network with proximal vehicles. Each vehicle C1-C13 may include an apparatus similar to those described above in relation to the apparatuses 2, 3 of FIGS. 2 and 3. In the diagram, vehicle C2 is the user's vehicle 104 and is designated as node 0. Proximal vehicles include a +1 or a −1 designation. Front proximal vehicles C3, C6, and C9 include a "+" and are front proximal vehicles +1A, +1B and +1C respectively. The middle lane is designated as lane A, the adjacent left lane is lane B, the adjacent right lane is lane C, the left-most lane is lane D, and the right-most lane is lane E. Vehicles C4, C7 and C10 that just ahead of the front proximal vehicles have a node designation of +2 plus the lane designator (e.g. +2A, +2B, +2C). Vehicles C5 and C13 that are ahead of these vehicles have a +3 designation (e.g. +3A, +3D). Rear proximal vehicles C1, C8, C11 and C12 have a negative node designator (e.g. −1A, −1C, −1D, −1E).

In the diagram 600, a first ad hoc network (short dashed lines) is established with respect to the user's vehicle C2 and includes vehicles C1, C3, C6 and C9. Vehicles C12 and C11, in the depicted embodiment, are excluded because they are more than one lane from the user's vehicle C2. In another embodiment, vehicles C11 and C12 are proximal vehicles and are included in the first network. The first network includes node 0, node +1A, node+1B, node+1C, node −1A, and node −1C. Note that the node designations are shown in relation to the user's vehicle C2. Each vehicle C1-C13 may set up similar node designations relative to the vehicle setting up the ad hoc network.

A second ad hoc network (dashed lines with one long and one short dash) is established with relation to vehicle C3 and includes vehicles C2, C4, C6, C7, and C9. A third ad hoc network (dashed lines with one long dash and two short dashes) is established with relation to vehicle C4 and includes vehicles C3, C5, C7, C9 and C10. An alert message generated by vehicle C5 may pass the message to vehicles C4, C7 and C10 and to vehicle C13 (if vehicles in lanes more than one lane away are included). Vehicle C4 may pass the alert message to vehicles C3, C6 and C9 (assuming vehicle C7 is not a rear proximal vehicle to vehicle C4). Vehicle C3 may pass the alert message to vehicles C2 and C6 and to vehicle C11 if vehicles in non-adjacent lanes are included. Vehicle C2 may pass the alert message to vehicles C1 and C8 and to vehicles C11 and C12 if vehicles in non-adjacent lanes are included.

As the alert message is passed, in one embodiment, the alert message is reduced in priority, for example, by the message priority module 302. One example of message priority is shown in Table 1. Further priority adjustments may be made based on lane of travel, where the priority, for example, may drop one or more levels where an alert message is passed to a vehicle in an adjacent lane or a non-adjacent lane. Priority, in other embodiments, may also be adjusted by distance. The alerts in Table 1 are for one embodiment, and one of skill in the art will recognize other priority designations based on proximity to a user's vehicle C2, lane, etc. Alert messages may also be adjusted based on message type. For example, a pothole may generate a "caution" alert level for all proximities in one lane, where an impending crash may generate an "extreme danger" alert, which may be reduced by proximity, lane, etc.

TABLE 1

| Magnitude | Proximity | Alert |
|---|---|---|
| Low | +1 | Caution |
| Low | +2 | Attention |
| Low | +3 | Attention |
| Medium | +1 | Warning |
| Medium | +2 | Warning |
| Medium | +3 | Caution |
| High | +1 | Extreme Danger |
| High | +2 | Danger |
| High | +3 | Warning |

In one embodiment, the message transmitter module 208, or other module may transmit data to be used for roadway maintenance, emergency personnel alert, etc. For example, the V2V network apparatus 102 may transmit information such as a location of a pothole along with GPS data, to a roadside beacon, satellite or other receiver for use by department of transportation personnel for road repairs. In another example, the V2V network apparatus 102 may transmit information regarding a crash to emergency personnel. One of skill in the art will recognize other uses of the V2V network apparatus 102 for transmitting information regarding vehicles, road conditions, etc.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a vehicle position module that determines a position of each of one or more proximal motor vehicles with respect to a user's motor vehicle, each proximal motor vehicle raveling in a same direction as the user's motor vehicle and within a sensor range, wherein each proximal motor vehicle is positioned in relation to the user's motor vehicle without another motor vehicle between the proximal motor vehicle and the user's motor vehicle;
a vehicle network module that establishes a communication link between the user's motor vehicle and one or more of the proximal motor vehicles, thereby forming an ad hoc network;
a message receiver module that receives a front alert message from a front proximal motor vehicle that is traveling in front of the user's motor vehicle;
a message transmitter module that:
transmits a rear alert message to a rear proximal motor vehicle that is traveling behind the user's motor vehicle in response to message receiver module receiving a front alert message received from the front proximal motor vehicle; and
transmits the rear alert message to the rear proximal motor vehicle that is traveling behind the user's motor vehicle in response to an alert message generated within the user's motor vehicle;
an alert action module that takes an action before the user of the motor vehicle is able to detect danger that affects control of the movement of the user's motor vehicle in response to receiving a front alert message from a front proximal motor vehicle; and
a message priority module which reduces priority of a front alert message received from the front proximal motor vehicle prior to the message transmitter module transmitting the rear alert message to a rear proximal motor vehicle.

2. The apparatus of claim 1, wherein the front alert message received by the message receiver module comprises one or more of a front alert message, generated within a front proximal motor vehicle and an alert message received by the front proximal motor vehicle from another motor vehicle ahead of the front proximal motor vehicle and relayed to the front proximal vehicle, the message priority module prioritizes the front alert messages received by the message receiver module based on a proximity of the motor vehicle where the front alert message originated with respect to the user's motor vehicle, wherein the front alert message generated by the front proximal motor vehicle has a higher priority than the front alert message received by the front proximal motor vehicle and relayed to the user's motor vehicle.

3. The apparatus of claim 2, wherein the alert action module takes actions with respect to the user's motor vehicle that differ based on one or more of alert message priority and a type of alert message.

4. The apparatus of claim 2, wherein the message priority module further prioritizes alert messages by how many motor vehicles are between a motor vehicle sending an alert message and the user's motor vehicle, wherein an alert message from a motor vehicle closer to the user's motor vehicle has a higher priority than an alert message from a motor vehicle further away from the user's motor vehicle.

5. The apparatus of claim 4, wherein a motor vehicle being closer to or further away from the user's motor vehicle is based on a number of motor vehicles away from the user's motor vehicle.

6. The apparatus of claim 1, wherein the message receiver module rejects alert messages sent directly from motor vehicles other than a proximal motor vehicle.

7. The apparatus of claim 1, wherein the motor vehicle position module further determines a position of each proximal motor vehicle using one or more of:
a global positioning satellite ("GPS") system;
short range radio frequency ("RF");
directional short range radar; infrared; and
laser light.

8. The apparatus of claim 1, further comprising an alert generation module that generates an alert message based on information from one or more sensors of the user's motor vehicle.

9. The apparatus of claim 8, wherein the one or more sensors of the user's motor vehicle sense one or more of:
a condition within the user's motor vehicle indicative of a crash;
a condition within the user's motor vehicle indicative of abnormal maneuvering of the user's motor vehicle;
a condition within the user's motor vehicle indicative a failure of a component of the user's motor vehicle; and o
one or more of an object and a condition in an area surrounding the user's motor vehicle indicative of one or more of a danger to the motor vehicle, a situation for emergency maneuvering of the user's motor vehicle, and an impending crash.

10. The apparatus of claim 1, wherein the action taken by the alert action module further comprises alerting a driver of the user's motor vehicle.

11. The apparatus of claim 1, wherein the front proximal motor vehicle comprises one or more of:
a motor vehicle traveling in a same lane as the lane that the user's motor vehicle is traveling and ahead of the user's motor vehicle; and
a proximal motor vehicle in a lane different than the lane that the user's motor vehicle is traveling and further ahead than the user's motor vehicle.

12. The apparatus of claim 1, further comprising a message limit module that prevents a front alert message received from a front proximal motor vehicle that has been transmitted through more than N motor vehicles before being transmitted to the user's motor vehicle from being transmitted to a rear proximal motor vehicle, wherein N is an integer and wherein N is a message travel limit expressed as a number of motor vehicles from the user's motor vehicle.

13. The apparatus of claim 1, wherein one or more of the proximal motor vehicles include the apparatus and a proximal motor vehicle with the apparatus transmits an alert message to a rear proximal motor vehicle behind the proximal motor vehicle with the apparatus, which includes the user's motor vehicle, the transmitted alert message comprising one of a front alert received from a front proximal motor vehicle in front of the proximal vehicle with the apparatus and an alert message generated by the proximal motor vehicle with the apparatus and wherein the vehicle network module of the user's motor vehicle and each proximal motor vehicle with the apparatus each establishes a wireless ad hoc network with proximal motor vehicles.

14. A system comprising:
a motor vehicle comprising:
- a vehicle position module that determines a position of each of one or more proximal motor vehicles with respect to a user's motor vehicle, each proximal motor vehicle raveling in a same direction as the user's motor vehicle and within a sensor range, wherein each proximal motor vehicle is positioned in relation to the user's motor vehicle without another motor vehicle between the proximal motor vehicle and the user's motor vehicle;
- a vehicle network module that establishes a communication link between the user's motor vehicle and one or more of the proximal motor vehicles, thereby forming an ad hoc network;
- a message receiver module that receives a front alert message from a front proximal motor vehicle that is traveling in front of the user's motor vehicle;
- a message transmitter module that:
  - transmits a rear alert message to a rear proximal motor vehicle that is traveling behind the user's motor vehicle in response to message receiver module receiving a front alert message received from the front proximal motor vehicle; and
  - transmits the rear alert message to the rear proximal motor vehicle that is traveling behind the user's motor vehicle in response to an alert message generated within the user's motor vehicle;
- an alert action module that takes an action before the user of the motor vehicle is able to detect danger that affects control of the movement of the user's motor vehicle in response to receiving a front alert message from a front proximal motor vehicle; and
- a message priority module which reduces priority of a front alert message received from the front proximal motor vehicle prior to the message transmitter module transmitting the rear alert message to a rear proximal motor vehicle.

15. A method comprising:
- determining a position of each proximal motor vehicle with respect to a user's motor vehicle, each proximal motor vehicle comprising one or more motor vehicles traveling in a same direction as the user's motor vehicle and within a sensor range, wherein each proximal motor vehicle is positioned in relation to the user's motor vehicle without another motor vehicle between the proximal motor vehicle and the user's motor vehicle;
- establishing a communication link between the user's motor vehicle and one or more of the proximal motor vehicles;
- receiving a front alert message from a front proximal motor vehicle that is traveling in front of the user's motor vehicle;
- transmitting a rear alert message to a rear proximal motor vehicle that is traveling behind the user's motor vehicle in response to receiving a front alert message from a front proximal motor vehicle;
- transmitting a rear alert message to a rear proximal motor vehicle that is traveling behind the user's motor vehicle in response to an alert message generated within the user's motor vehicle;
- taking an action, before the user of the motor vehicle is able to detect danger, that affects control of the user's motor vehicle in response to receiving an alert message from a front proximal motor vehicle; and
- reducing priority of a front alert message received from the front proximal motor vehicle prior to transmitting the rear alert message to a rear proximal motor vehicle.

16. The method of claim 15, wherein the front alert message received from the front proximal motor vehicle comprises one or more of an alert message generated within the front proximal motor vehicle and an alert message received by the front proximal motor vehicle from another motor vehicle ahead of the front proximal motor vehicle and wherein the method further comprises prioritizing the front alert messages received from the front proximal motor vehicle based on a proximity of the motor vehicle where the alert message originated to the user's motor vehicle, wherein an alert message generated by the front proximal motor vehicle has a higher priority than an alert message received by the front proximal motor vehicle and relayed to the user's motor vehicle.

17. The method of claim 15, further comprising generating an alert message based on information from one or more sensors of the user's motor vehicle.

18. An apparatus comprising:
- a vehicle position module that determines a position of each proximal motor vehicle with respect to a user's motor vehicle, each proximal motor vehicle traveling in a same direction as the user's motor vehicle and within a sensor range, wherein each proximal motor vehicle is positioned in relation to the user's motor vehicle without another motor vehicle between the proximal motor vehicle and the user's motor vehicle;
- a vehicle network module that establishes a communication link between the user's motor vehicle and one or more of the proximal motor vehicles via a wireless ad hoc network;
- a message receiver module that receives a front alert message from a front proximal motor vehicle that is in front of the user's motor vehicle;
- a message priority module that prioritizes the front alert messages received by the message receiver module based on a proximity of the motor vehicle where the alert message originated with respect to the user's motor vehicle, wherein a front alert message generated by the front proximal motor vehicle has a higher priority than a front alert message received by the front proximal motor vehicle and relayed to the user's motor vehicle;
- an alert generation module that generates an alert message based on information from one or more sensors of the user's motor vehicle;
- a message transmitter module that:
  - transmits an alert message to a rear proximal motor vehicle that is traveling behind the user's motor vehicle in response to the message receiving module receiving a front alert message from a front proximal motor vehicle; and
  - transmits the rear alert message to the rear proximal motor vehicle that is traveling behind the user's motor vehicle in response to an alert message generated within the user's motor vehicle by the alert generation module;
- a message limit module that prevents the alert message received from the front proximal motor vehicle that has been transmitted through more than N motor vehicles before being transmitted to the user's motor vehicle from being transmitted to a rear proximal motor vehicle, wherein N is an integer and wherein N is a message travel limit expressed as a number of motor vehicles from the user's motor vehicle; and an alert action module that takes an action that affects the movement of the user's motor vehicle, before the user of the motor vehicle is able to detect danger, in response to receiving an alert message from a front proximal motor vehicle.

\* \* \* \* \*